June 8, 1965 A. BUSALA 3,188,398

TRANSMISSION IMPROVEMENT IN PARTY-LINE TELEPHONE SYSTEMS

Filed Sept. 27, 1961 2 Sheets-Sheet 1

INVENTOR
A. BUSALA
BY J. V. De Simone
ATTORNEY

TRANSMISSION IMPROVEMENT IN PARTY-LINE TELEPHONE SYSTEMS

Filed Sept. 27, 1961

2 Sheets-Sheet 2

INVENTOR
A. BUSALA
BY I. V. De Simone
ATTORNEY 3,188,398
Patented June 8, 1965

3,188,398

TRANSMISSION IMPROVEMENT IN PARTY-LINE TELEPHONE SYSTEMS

Alessandro Busala, Berkeley Heights, N.J., assignor to Bell Telephone Laboratories, Incorporated, New York, N.Y., a corporation of New York Filed Sept. 27, 1961, Ser. No. 141,147
3 Claims. (Cl. 179—35)

This invention concerns telephone systems. In particular it concerns party-line telephone systems in which two or more telephone substations are bridged across a common line and in which transmitter power is derived from a common battery It is an object of the invention to improve the over-all quality of transmission in party-line telephone systems and to do so simply and economically.

The economic advantages of party-line systems are often considerably offset by technical disadvantages. One disadvantage, which has been with us virtually since the beginning of the telephone era, has been the problem of improving the transmission of voice signals from the remotely located subscribers of party-line systems. To understand this problem we ought to consider first the nature of a typical telephone instrument.

In a modern telephone transmitter, granules of carbon are held between two electrodes—one a cup holding the granules and the other a diaphragm. The contact resistance between the granules is changed by sound pressure on the diaphragm. The resulting resistance variation modulates a battery current flowing between the electrodes. An acoustic message is thus transformed into an electrical signal, the level of which is dependent both on the value of direct current flowing between the transmitter electrodes and the varying resistance between them. In the receiver, the varying component of this signal passes through a winding on a permanent magnet. The variation in the strength of the magnetic field causes vibration of a diaphragm, which in turn generates sound waves corresponding to those of the original acoustic message.

Now, when two or more subscribers in a party-line telephone system are off-hook simultaneously, the distribution of current to their transmitters will depend upon the resistance between the common battery and their respective transmitters. Consequently, at the expense of the remote subscriber, the telephone set which is nearer to the central office receives a disproportionate share of the common battery current. In typical cases, this disproportion can reach ratios of more than 3 to 1—that is, the nearer subscriber may receive three times as much common battery current as does the distant subscriber. The result is comparatively poor transmission from the more distanct subscriber.

In a party-line arrangement, therefore, the remote subscriber in effect becomes the neglected step-child of the system. To improve his lot, many schemes have been tried in the past. Since the transmission of telephone voice messages is one of the oldest and most basic problems in the field of electrical communications, we can go as far back as Patent No. 234,578, which issued to G. d'Infreville on November 16, 1880. d'Infreville proposed the use of resistance build-out in party-line systems. That is to say, he proposed the equalization of the resistance of all paths connecting a common battery to the various subscriber stations by inserting ohmic resistances in appropriate paths. The trouble with d'Infreville's proposal is that bulky by-pass capacitors are necessary to insure the successful transmission of voice messages around the inserted ohmic resistances. Accordingly, this method has been avoided. Another method employed in the past has been the use of local battery sets, either to supply transmitter power exclusively to their associated transmitters or to assist a common battery in this supply. This method was employed as recently as five or six years ago, but it, too, was ultimately abandoned because of the undesirability and impracticality of the frequent battery replacement procedures.

The illustrative prior art methods, mentioned above, have either failed in the first instance to secure adherents or been abandoned as impractical, undesirable, or uneconomical with the result that the power-starved remote subscriber still remains a neglected and indignant member of the party-line family. It was to give him equal status with his fellow subscribers that the present invention was conceived.

In accordance with the invention, diode networks are inserted in appropriate ones of the subscriber loops of a party-line system. The number of diode elements in any network is made to depend upon the proximity of its associated telephone set to the system's common battery; the closer the set, the more the elements. Each of these elements imposes a predetermined power loss on the common battery current, but the transmission of voice messages is relatively unaffected. This beneficient difference, it will be recalled, is due to the nonlinearity of the diode elements: whereas their resistance to direct current is determined by the ratio of voltage to current at any point on their volt-ampere characteristic, their impedance to alternating currents depends upon the slope of the characteristic at that point. Their nonohmic behavior makes possible an equitable distribution of the common battery current, but not at the expense of elaborate or unwieldy by-pass arrangements. When, say, a remote subscriber and a "close-in" subscriber are simultaneously off-hook in a revertive call, the invention thus sees to it that they equally share the common battery current that flows through their transmitters.

The various objects and features of the invention will become more apparent after a consideration of the following discussion and the drawing to which it relates.

Figure 1:
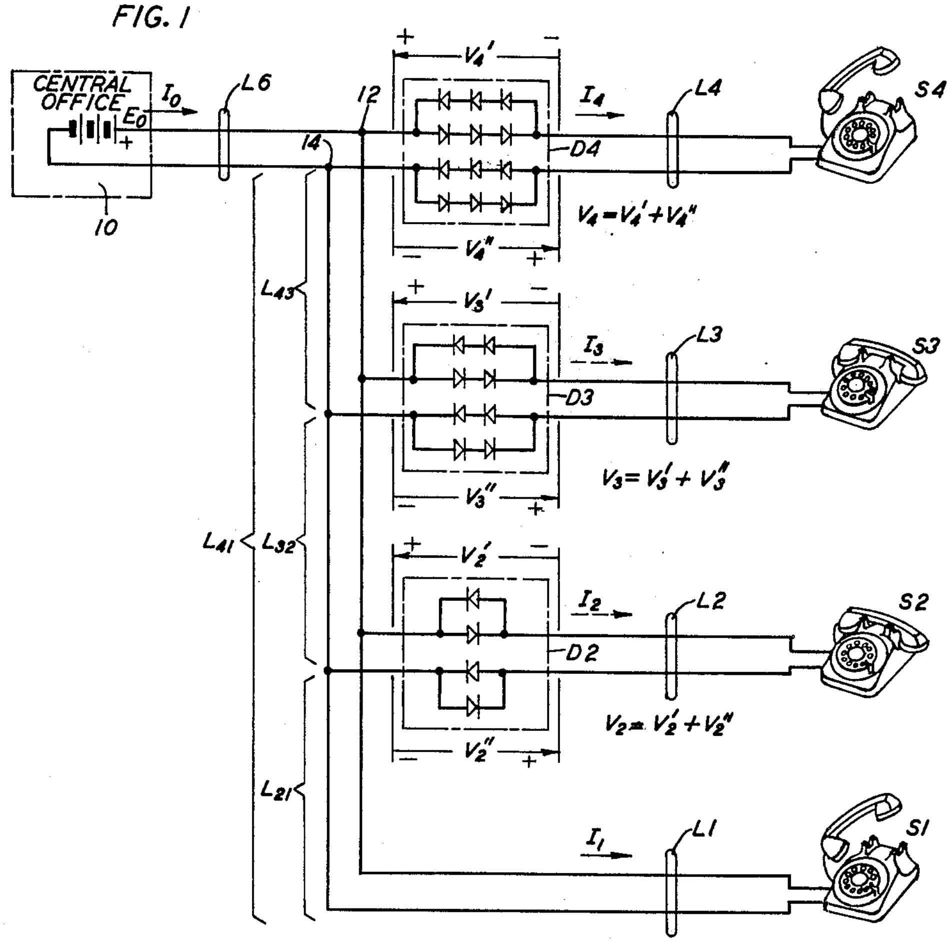
FIG. 1 is a very simplified diagram of a telephone party-line system arranged in accordance with the invention.

In FIG. 1, four subscriber loops L1, L2, L3 and L4, the terminations of which are located at some distance from each other and from their associated central office 10, are connected at the central office to the common terminals 12 and 14 by way of a common line $L_{41}$. The diode networks D2, D3 and D4 are inserted in the loops L2, L3 and L4, respectively.

For the sake of simplicity, only four subscriber loops are shown. Likewise, the well-known particulars are the central office 10 and of the substations S1, S2, S3 and S4 have been omitted. For the circuit details of a typical central office and substation, reference may be respectively made to Patent No. 2,585,904, which issued February 19, 1952, to A. J. Busch, and to Patent No. 2,629,783, which issued on February 24, 1953, to H. Hopkins.

Various combinations of calls are possible in the system shown. For example, the subscriber S4 may wish to call the subscriber S1. Since they are both bridged across the same common line, $L_{41}$, the call is what is known as a "revertive" call. Another type of call that may be effected in the system of FIG. 1 is one where, for example, the substation S1 would be calling, through the central office 10, a party in another telephone exchange (not shown). This call is commonly known as an "outside" call.

For the purposes of the discussion that follows, the substations S4 and S1 are shown off-hook and, therefore, in a revertive talking relationship. The substations S2 and S3 are shown on-hook. Consequently, the current $I_0$ from the common battery $E_0$ flows only in the subscriber loops L1 and L4.

It can be seen that the telephone set S1 is the one most remote from the central office 10, for the current $I_0$ must traverse the entire length of the common line $L_{41}$ in order to reach the telephone set S1. Accordingly, absent the practice of the invention, the current $I_1$ would be considerably less than the current $I_4$. We assume here that the subscriber loops L1, L2, L3 and L4 are all roughly of the same length. They would in practice, however, be of varying length and, indeed, the loop L1 could be the longest loop in the system, which would aggravate the unequal distribution of current from the common battery $E_0$.

Now since the telephone set S1 is farther removed from the common battery $E_0$ than is the telephone set S4 a semiconductor network D4 is inserted in the loop L4. We do not need such a network in the loop L1, because we have assumed that the set S1 would receive the smallest portion of the current $I_0$ if all of the telephone sets S1, S2, S3 and S4 were off-hook. Accordingly, we do not wish to further restrict the flow of battery current in the loop L1. Rather, we wish to enhance this flow by impeding current flow in the other loops.

The network D4, by way of example, comprises twelve diodes, six of which are inserted on each side of the loop L4. It is advantageous to arrange each of these six-diode groups in parallel, oppositely-poled branches. This expedient makes installation a simple matter and avoids polarity complications should any of the loops be bridged incorrectly across the common line $L_{41}$ or should the system employ both positive and negative ringing pulses. It should be understood that the specific numbers of diodes shown in FIG. 1 are intended only to exemplify the invention.

The diodes of FIG. 1 may all be of the same type, in which case their characteristics would be standard, and the required degree of opposition to the common battery current could be achieved by employing an appropriate number of diode elements per network; or they could have different characteristics, in which case the type as well as the number of diode elements in each network would be considered.

For example, if, instead of the arrangement shown, a pair of diodes were inserted in each side of the loop L4 so that the network D4 would be schematically identical to the network D2, then the diode elements of the network D4, when normally conductive, would have to provide a greater direct current voltage drop than would the elements of the network D2.

Figure 2:
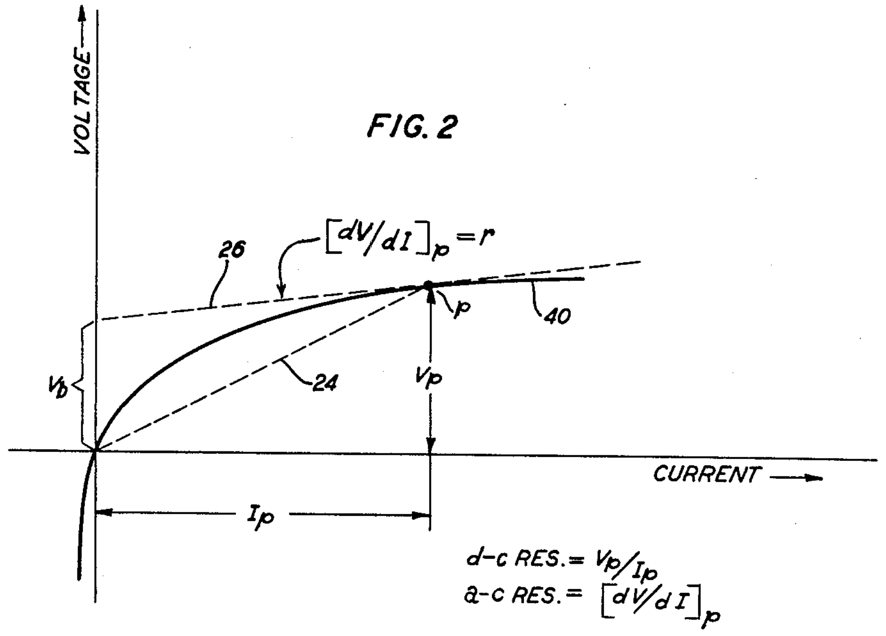
FIG. 2 is a volt-ampere characteristic of a typical semiconductor diode.

FIG. 2 is a plot of the voltage across any of the diodes of FIG. 1 as against the current therethrough. The diodes serve as one-way valves, through which current flows easily in one direction but with great difficulty in the other.

Since a semiconductor diode is a nonlinear element, when we talk about its characteristics we should know what we mean when we use the term "resistance." At any point $p$ of FIG. 2, the direct current (D.-C.) resistance is equal to the ratio of the voltage to the current at that point—that is to say, it is equal to $V_p/I_p$.

In FIG. 1, voice signals are superimposed on direct current from the common battery $E_0$. A voice signal superimposed on the direct current $I_p$ of FIG. 2 will see a resistance, not of value $V_p/I_p$, but rather of the slope of the characteristic at the point $p$: namely, $[dV/dI]_p$. This resistance, which we call $r$ in FIG. 2, is called the A.-C., dynamic, or incremental resistance and is represented by the slope of the dotted line 26. We can see that this slope is considerably less than the slope of the line 24, which joins the origin and the point $p$ and has a slope equal to the D.-C. resistance $V_p/I_p$. This explains one advantageous aspect of the invention: capacitors for by-passing voice currents around the diodes of FIG. 1 are not necessary.

We have now to consider a method by which the opposing voltages $V_2$, $V_3$ and $V_4$ may be determined. These voltages are defined in FIG. 1. Since any pair of subscribers can be off-hook at any time, one way to solve this problem is to determine the opposing voltage (or voltages) required to effect equal current sharing for each possible pair of off-hook subscribers.

The precise values of these opposing voltages will depend on the system parameters: the potential of the common battery $E_0$; the values of (1) the resistance encountered in the central office 10, (2) the resistance of the loop L6, which extends from the central office 10 to the terminals 12 and 14, (3) the resistances of the connecting lines $L_{43}$, $L_{32}$ and $L_{21}$, (4) the resistances of the loops L1, L2, L3 and L4, and (5) the resistance (presumably constant) of each of the telephone sets S1, S2, S3 and S4.

In FIG. 1, for example, we could compute the required value of $V_2$ with the sets S1 and S2 simultaneously off-hook. Inserting $V_2$ in the loop L2, we could then compute the required voltage of $V_3$—first with the sets S3 and S1 simultaneously off-hook and then with the sets S3 and S2 simultaneously off-hook. These computations would ordinarily be slightly different, so we would choose a value of $V_3$ that would approximately satisfy both of them. Finally, after inserting $V_3$ in the loop L3, we would compute the required voltage of $V_4$ by successively computing the cases where the sets S4 and S3, then the sets S4 and S2, and then the sets S4 and S1 are simultaneously off-hook.

Having determined the voltage opposition to be given by each of the networks D2, D3 and D4 to current from the common battery $E_0$, we could then assemble these networks with appropriate numbers and types of semiconductor diodes.

Figure 3:
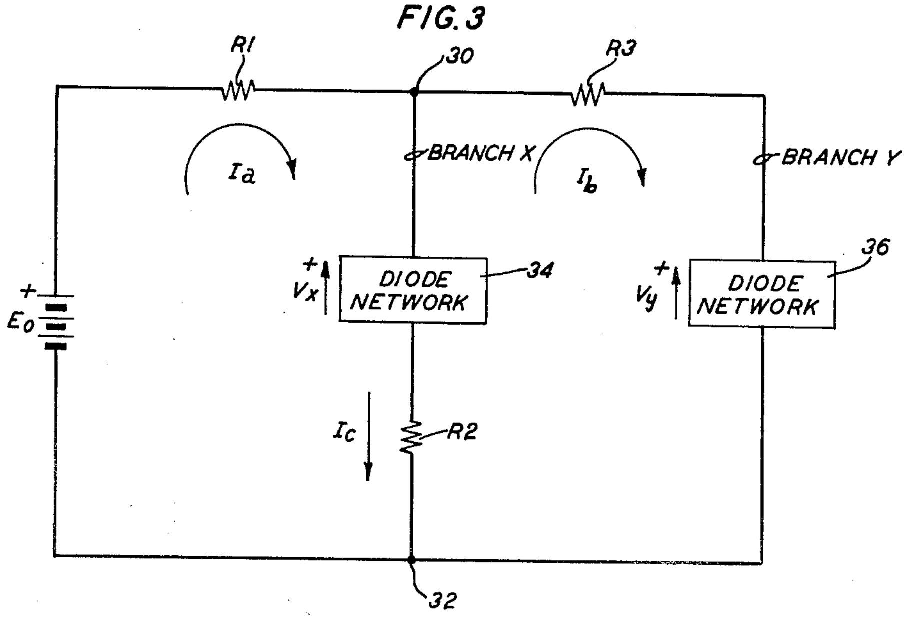
FIG. 3 is an equivalent circuit, which may be used to compute the parameters needed for a substantially equal distribution of common battery current to the various telephone sets of FIG. 1.

We can illustrate this method of computation with the assistance of FIG. 3. FIG. 3 is a simplified and generalized equivalent circuit that pertains to FIG. 1. It is simplified in that it takes only two of the subscriber loops into account. It is generalized in that it may be used to determine the opposing voltage (or voltages) required to effect equal current sharing for any possible pair of the loops. Thus, the opposing voltages have been labeled $V_x$ and $V_y$. One of these voltages may be zero, which would be the case when one of the loops being considered is the loop L1.

The branch lying between the junctures 30 and 32 and including the diode network 34 represents one of the subscriber loops of FIG. 1. Let us call this branch X. The branch including the diode network 36 represents another of these loops. Let us call this branch Y. The junctures 30 and 32 are the points at which the two loops meet on the common line $L_{41}$ (FIG. 1). For example, if the two loops under consideration are the loops L1 and L4, then the junctures 30 and 32 of FIG. 3 would correspond to the junctures 12 and 14 of FIG. 1. The branch X would be, say, the loop L4 and the branch Y would then be the combination of the common line $L_{41}$ and the loop L1.

We can determine the values of $V_x$ and $V_y$ by using mesh equations based on Kirchhoff's laws. The parameters of FIG. 3 relates to FIG. 1 as follows:

$E_0$=the voltage of the common battery $E_0$;
$I_a$=the common battery current $I_0$;
$I_b$=the loop current in one of the subscriber loops L1, L2, L3 or L4;
$I_c$=another of these loop currents;
$R1$=the combined resistance of common battery $E_0$ and the transmission line connecting this battery to the junctures 30 and 32, wherever these may be on the common line $L_{41}$;

$R2$=the combined resistance of one of the subscriber loops being considered and its associated telephone set; and $R3$=the combined resistance of the other subscriber loop being considered, its associated telephone set, and that portion of the common line $L_{41}$ which connects this loop to the junctures 30 and 32.

We want to equalize the currents flowing through the loops being considered. Accordingly, we let $$I_b = I_o = \frac{I_a}{2}$$

Mesh analysis therefore yields the following equation:

$$V_x = \frac{E_0(R3-R2)}{2R1+R3} + \frac{V_y(2R1+R2)}{2R1+R3}$$

Now for the case previously assumed (S1 and S4 off-hook, S2 and S3 on-hook), we can ignore the second term on the right-hand side of the equation next above. We can do this because the loop L1 has no diode network and, therefore, $V_y$ is equal to zero. Substituting $V_4$ for $V_x$, we find that $$V_4 = \frac{E_0(R_3-R_2)}{2R1+R3}$$

The other possible off-hook combinations and the requisite opposing voltages can be solved in the same manner. Knowing these voltages, we are in a position to provide them by assembling the networks D2, D3 and D4 with appropriate numbers and/or types of semiconductor diodes.

Let us correlate FIGS. 2 and 3. First, it should be noted that the voltage $V_b$ of FIG. 2 is the D.-C. opposing voltage to be expected from the diode which the volt-ampere characteristic 40 represents.

We should also note that the A.-C. resistance $r$ (FIG. 2) is negligible in comparison to the normal loop resistance (e.g., R2 of FIG. 3) and, therefore, can be ignored. In our choice of a suitable diode (or diodes) we would choose one providing a D.-C. opposing voltage $V_b$ which is approximately equal to or a submultiple of the voltage, say $V_4$, that we have computed.

Suppose, for example, that our computations revealed that $V_4$ must be approximately 3.6 volts to effect substantial current equalization. Since only six of the diodes arbitrarily shown in the network D4 are in circuit at any time, we might therefore have chosen them because they each offer a 0.6 volt D.-C. opposing voltage to the current $I_4$ and, consequently, a total opposition of 3.6 volts. Other alternatives will be apparent to persons skilled in the art of communications.

The specific embodiment that has been described should not be construed as limiting the scope of the invention.

What is claimed is:

1. In a party-line telephone system, a central office comprising a source of common battery current; a plurality of subscriber loops; a main transmission line; each of said loops having one end connected across said main line and having another end connected across a telephone set; said main line connecting said central-office source of common battery current to each of said loops; and a plurality of semiconductor networks inserted serially in said loops, said networks being capable of bilateral conduction and having various direct-current resistances for dissipating direct-current power to insure a substantially equal flow of said common battery current in said loops, said networks further having alternating-current resistances which are substantially less than said direct-current resistances when said common battery current flows through said networks.

2. A system in accordance with claim 1 in which each of said semiconductor networks comprises a path for simultaneous transmission of direct current and alternating-current telephone message signals in the respective one of said loops, the alternating-current resistance of said network being sufficiently smaller than the direct-current resistance of said network to permit a substantially unhampered flow of telephone message signals through each of said networks when said common battery current also flows through said networks.

3. In a party-line telephone system, a central office comprising a source of common battery current; a plurality of subscriber loops having direct-current resistances; a main transmission line having direct-current resistance; each of said subscriber loops having one end connected across said main line and having another end terminated by a telephone set; said main line connecting said central office source of said common battery current from said central office to each said telephone set when it is off-hook; and a plurality of diode networks inserted serially in appropriate ones of said subscriber loops to substantially equalize the flow of common battery current in any pair of said loops when the respective telephone sets of said any pair are simultaneously off-hook, said plurality of diode networks comprising diodes connected in parallel combinations in opposite conduction polarities, said diode networks having direct-current resistances which are inversely related to the respective sums of said direct-current resistances of the remainders of said loops and the portions of said resistance of said main line between said loops and said central office source, said diode networks also having dynamic resistances which are substantially less than said direct-current resistances of said diode networks when said common battery current flows through said networks.

References Cited by the Examiner

UNITED STATES PATENTS 3,035,122 5/62 Livingstone ------------ 179—16

ROBERT H. ROSE, *Primary Examiner.*

WILLIAM C. COOPER, *Examiner.*